(12) United States Patent
Todorovic

(10) Patent No.: US 9,376,986 B2
(45) Date of Patent: Jun. 28, 2016

(54) AIRCRAFT GAS TURBINE THRUST-REVERSING DEVICE

(71) Applicant: Rolls-Royce Deutschland Ltd & Co KG, Blankenfelde-Mahlow (DE)

(72) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 636 days.

(21) Appl. No.: 13/758,248

(22) Filed: Feb. 4, 2013

(65) Prior Publication Data

US 2013/0205753 A1  Aug. 15, 2013

(30) Foreign Application Priority Data

Feb. 14, 2012  (DE) .......................... 10 2012 002 885

(51) Int. Cl.
*F02K 1/72* (2006.01)
*F02K 3/02* (2006.01)
*F02K 1/64* (2006.01)

(52) U.S. Cl.
CPC ... *F02K 1/72* (2013.01); *F02K 1/64* (2013.01); *F02K 3/025* (2013.01)

(58) Field of Classification Search
CPC ............... F02K 1/64; F02K 1/70; F02K 1/72; F02K 1/763
See application file for complete search history.

(56) References Cited

U.S. PATENT DOCUMENTS

| 3,831,376 A | 8/1974 | Moorehead |
| 6,256,980 B1 | 7/2001 | Lecordix et al. |
| 6,385,964 B2 * | 5/2002 | Jean et al. .................... 60/226.2 |
| 2008/0010969 A1 | 1/2008 | Hauer et al. |
| 2009/0288386 A1 | 11/2009 | Marshall et al. |
| 2009/0301056 A1 | 12/2009 | Hatrick |
| 2011/0167790 A1 | 7/2011 | Cloft et al. |

OTHER PUBLICATIONS

German Search Report dated Dec. 3, 2012 from counterpart application.

* cited by examiner

*Primary Examiner* — Devon Kramer
*Assistant Examiner* — Kenneth J Hansen
(74) *Attorney, Agent, or Firm* — Timothy J. Klima; Shuttleworth & Ingersoll, PLC

(57) ABSTRACT

An aircraft gas turbine thrust-reversing device has an engine cowling, the rear area of which is displaceable in the axial direction of the engine from a closed forward thrust position into a rearwardly displaced thrust reversal position, resulting in an essentially annular space to a front and stationary area of the engine cowling. The rear area of the engine cowling is coupled to deflecting elements and blocker doors, which in the forward thrust position are arranged completely inside the front area of the engine cowling. A drive element is provided between the front area and the rear area, which effects the axial displacement of the rear area. The drive element is a two-stage drive element, effecting in a first stage an axial displacement by an axial partial displacement path, and in a second stage an axial displacement by the full axial displacement path.

13 Claims, 5 Drawing Sheets

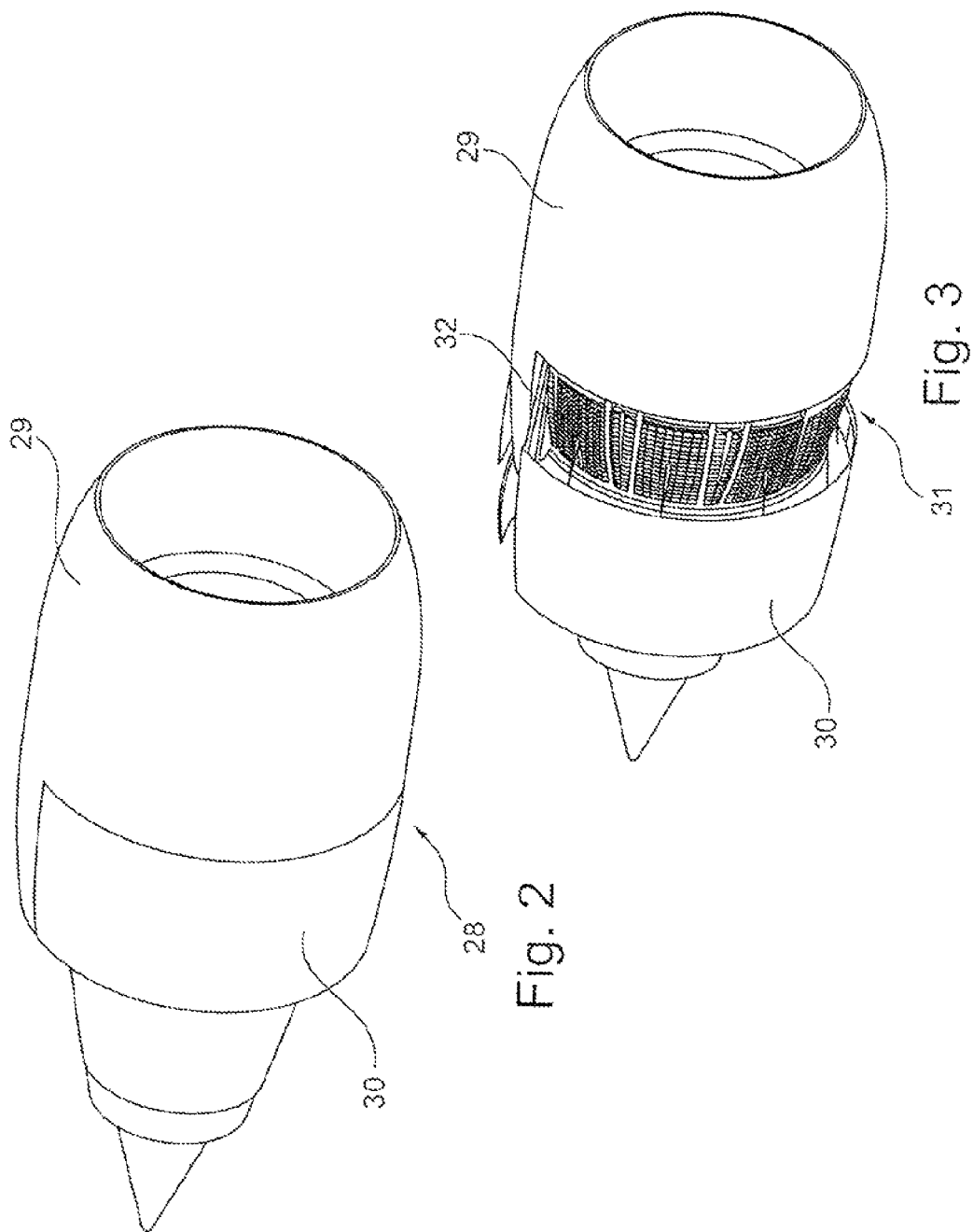

AIRCRAFT GAS TURBINE THRUST-REVERSING DEVICE

Figure 1:
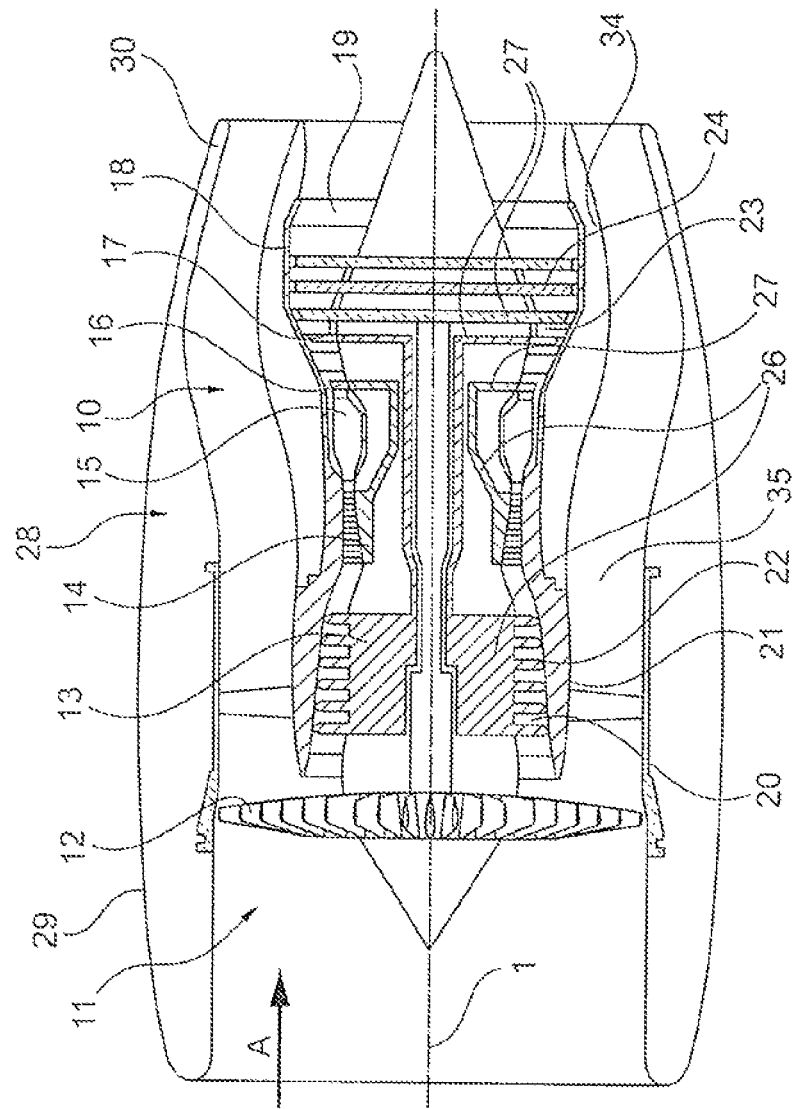

This application claims priority to German Patent Application 102012002885.7 filed Feb. 14, 2012, the entirety of which is incorporated by reference herein.

This invention relates to a thrust-reversing device of an aircraft gas turbine engine, with an engine cowling (nacelle) and with several variable-position deflecting elements arranged on the circumferential area.

It is known from the state of the art that thrust-reversing devices have a lever mechanism inside the bypass duct. This lever mechanism swivels during the transition into the thrust reversal position in order to move deflecting elements and blocker doors into the flow path. The lever mechanism includes pulling elements which draw the blocker doors into their positions when the rear area of the engine cowling is moved rearwards. In the process, the blocker doors are swiveled into their full blocking position, in which they divert the airflow for thrust reversal. At the same time, the airflow is guided, by the axial displacement of the rear area of the engine cowling, through the free annular space thus formed in order to achieve the thrust reversal. It has proven to be a disadvantage here that the lever mechanism and its associated bearings impede the flow through the bypass duct and minimize the efficiency of the aircraft gas turbine. Furthermore, the more difficult access to the core engine results in further drawbacks, in particular during maintenance. In view of the complex structure of the lever mechanism and of the entire thrust-reversing device, the production effort is high, which results in high costs.

US 2009/0301056 A1 shows a design in which the deflecting elements or flow-guiding elements are displaced in a straight line at an angle to the axial axis of the engine. Here too, it is necessary to modify the geometry of the core engine cowling such that a complete flow diversion can be achieved. This leads to disadvantages for performance in forward thrust mode.

The object underlying the present invention is to provide an aircraft gas turbine thrust-reversing device of the type specified at the beginning which, while being simply designed and easily and cost-effectively producible, is characterized by high efficiency and can be used for different geometries of aircraft gas turbines.

It is a particular object of the present invention to provide solution to the above problems by a combination of the features described herein. Further advantageous embodiments of the present invention become apparent from the description.

It is thus provided in accordance with the invention that a rear area of the engine cowling can be displaced in the axial direction of the engine from a closed forward position into an aftly displaced thrust reversal position, resulting in the annular space already mentioned, through which the thrust reversal flow can be routed radially outwards and against the flight direction. The rear area of the engine cowling is, in accordance with the invention, coupled here to deflecting elements and blocker doors. Both are arranged, in accordance with the invention, in the forward thrust position completely inside the front area of the engine cowling. In accordance with the invention, at least one drive element is arranged between the front area of the engine cowling and the rear area of the engine cowling, and effects the axial displacement of the rear area of the engine cowling. This drive element is designed in accordance with the invention as a two-stage drive element. In a first stage, an axial displacement over a predetermined first path is effected, while in the second stage an axial displacement by the remaining path takes place in order to move the rear engine cowling completely in the axial direction, thereby clearing the annular space.

In accordance with the invention, both the drive element (or the several drive elements, depending on the respective design) and the blocker doors and deflecting elements are thus fully accommodated inside the engine cowling when the latter is in the forward thrust position. It is thus possible to design the radially outer wall of a bypass duct enclosing the core engine such that no structural elements whatsoever are present to disrupt the flow. The result is a surface which is smooth in terms of air flow. The transition between the front and stationary area of the engine cowling and the rear, displaceable area of the engine cowling is thus reduced to a single annular contact area which can be suitably sealed and configured to be smooth in terms of air flow. This ensures an optimum flow guidance through the bypass duct.

Using a two-stage drive element, which can be of the hydraulic or electric type, enables an exact two-stage movement of the elements of the thrust-reversing device. In the first stage, the blocker doors are not yet swiveled, so that they are still substantially closing the free space formed, allowing a major part of the flow through the bypass duct to flow out rearwards, as in the forward thrust position. Only in the second stage of the movement of the drive element are the blocker doors swiveled into the bypass duct and block the latter, such that the flow through the free annular space is diverted radially outwards and can be routed by the deflecting elements against the flight direction of the aircraft.

In a favourable development of the invention, it is provided that the drive element is designed telescopic. It can for example be designed as a hydraulic piston/cylinder arrangement, or for example include a rack and a pinion or the like.

In accordance with the invention, the drive element effects the already mentioned axial displacement of the rear area of the engine cowling. The drive element furthermore effects an axial displacement of both the blocker doors and the deflecting elements from their position provided in the front area of the engine cowling while the thrust-reversing device is in the forward thrust position. The blocker doors and the deflecting elements can here be moved directly by the drive element and hence be coupled to the latter. It is also possible to couple them to the rear area of the axially displaceable engine cowling. The blocker doors are swiveled preferably automatically by means of a lever mechanism or in similar manner. In the first stage of the displacement by the drive element, both the deflecting elements and the blocker doors are thus located inside the free annular space. Only in the second stage of the axial displacement are the deflecting elements moved fully into the free annular space. This is done simultaneously with the swiveling of the blocker doors.

Figure 4:
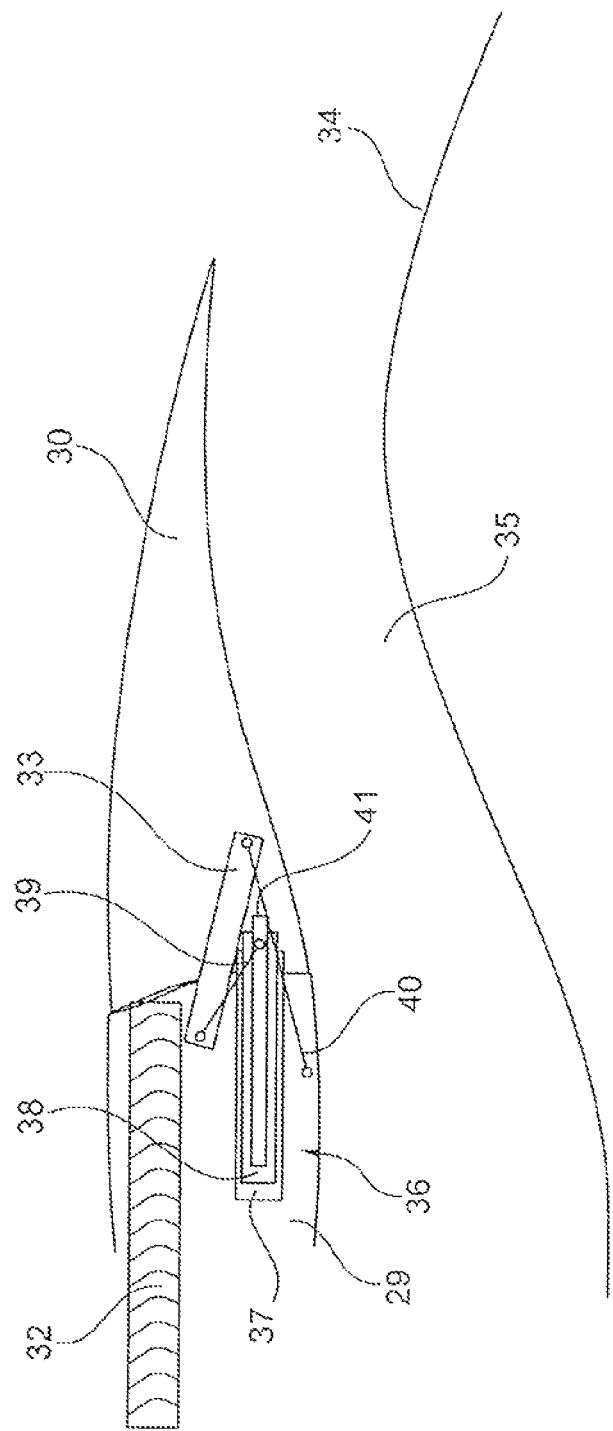
Figure 5:
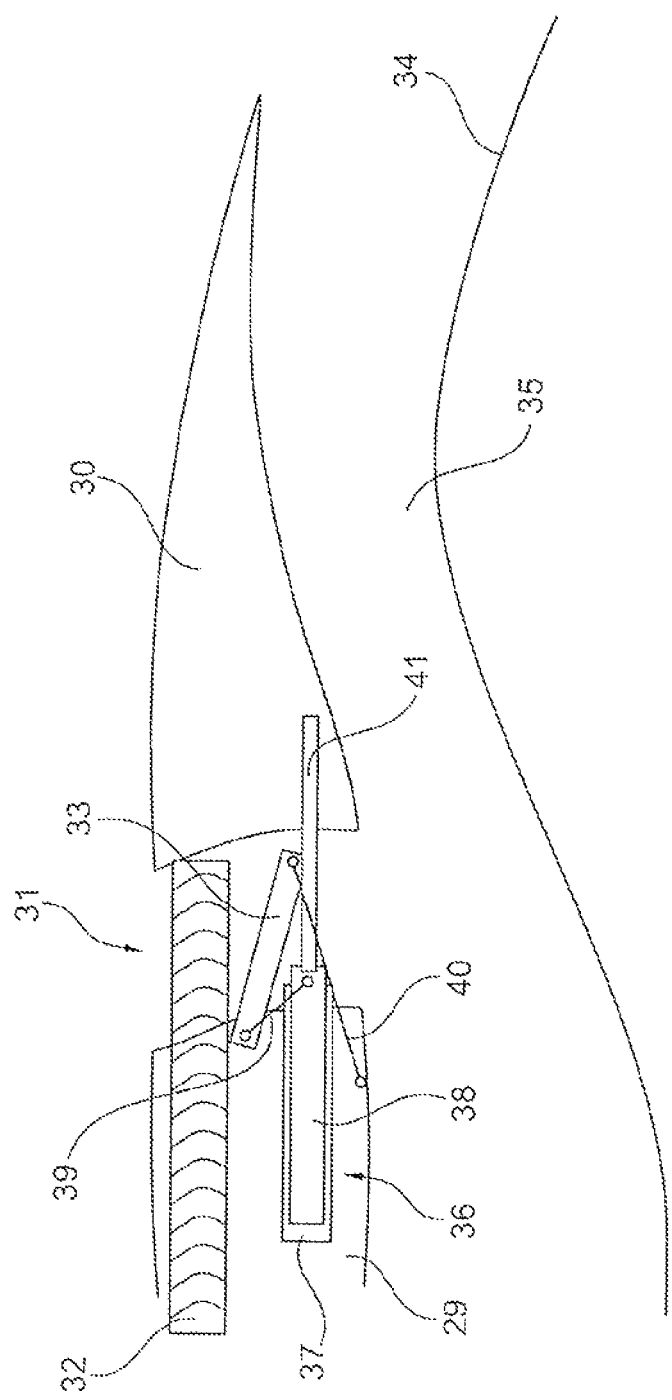
Figure 6:
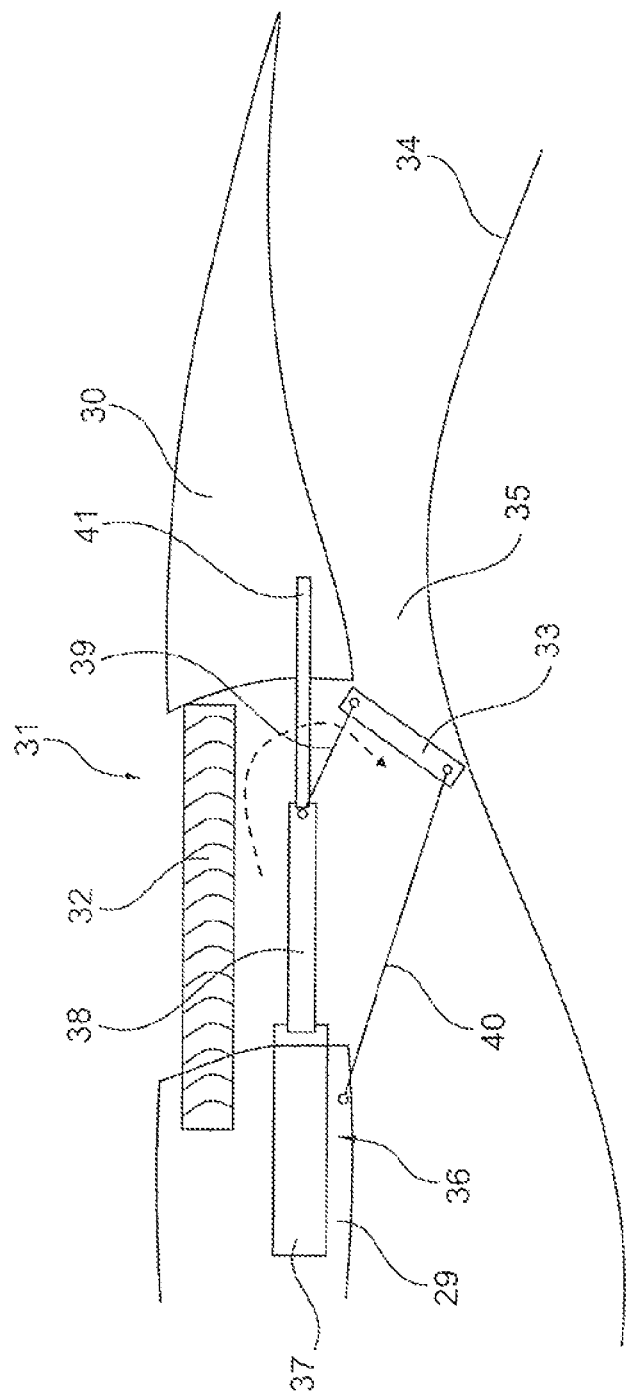

The present invention is described in the following in light of the accompanying drawing, showing an exemplary embodiment. In the drawing, FIG. 1 shows a schematic representation of a gas-turbine engine in accordance with the present invention, FIGS. 2, 3 show perspective views of an aircraft gas turbine in accordance with the present invention, obliquely from the front in forward thrust position and thrust reversal position, respectively, and FIGS. 4 to 6 show perspective side views of the different positions of the thrust-reversing device.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, an annular combustion chamber 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 1 furthermore shows a cowling 34 of a bypass duct 35.

FIGS. 2 and 3 each show simplified perspective representations of the aircraft gas turbine in accordance with the invention with a thrust-reversing device. FIG. 2 shows a forward thrust position in a view obliquely from the front, in which the cowling 28 is closed to permit an undisrupted flow through the bypass duct. It can be discerned here in particular that a front area 29, which remains stationary, of the cowling 28 forms the first part of the limitation of the bypass duct 35, while a rear area 30 of the cowling 28 can be displaced in the axial direction. FIG. 2 thus shows the forward thrust position, while FIG. 3 shows the thrust reversal position in which the rear area 30 of the cowling 28 is axially displaced. This results in a free annular space 31 which is interrupted only by the area of a pylon, not illustrated in detail, for mounting the aircraft gas turbine.

The deflecting elements 32 are designed grid-like or cascade-like and include a plurality of guiding elements designed for an optimized flow.

The deflecting elements 32 can for example be produced as castings or as composite parts.

In the description, the terms "front" and "rear" relate to the direction of flow through the aircraft gas turbine, where "front" is the inlet area and "rear" the outlet area.

FIGS. 4 to 6 show three different operating states of the thrust-reversing device in accordance with the invention. The flow through it is from the left to the right, by analogy with the illustration in FIG. 1.

FIG. 4 shows a state in the forward thrust position, in which the front area 29 and the rear area 30 of the engine cowling 28 are completely and tightly in contact with one another. It can be seen here in particular that the deflecting elements 32 (cascades) and the blocker doors 33 are completely accommodated inside the engine cowling and hence do not impede the flow through the bypass duct 35.

FIG. 5 shows a first displacement state in which the rear area 30 of the engine cowling has been displaced by a first displacement path using the drive element 36. The free annular space 31 is here opened by around half of its axial length. The blocker doors 33 are located inside the partially opened annular space 31. Also, some of the deflecting elements 32 are arranged in the partially opened annular space 31.

The illustrations in FIGS. 4 to 6 show that the drive element 36 is designed in multiple stages in telescopic form, for example as a multiple piston/cylinder unit. In the exemplary embodiment shown in FIGS. 4 to 6, the piston/cylinder unit is designed such that it includes a main cylinder 37 mounted firmly on the front area 29 of the cowling 28. An intermediate element 38 is displaceably mounted inside the main cylinder 37 and can be displaced like a double-acting piston. At the free end of the intermediate element 38, a first connecting element 39 is mounted in articulated manner and connected at its free end to the blocker door 33 in articulated manner. An opposite end area of the blocker door 33 is coupled in articulated manner to a second connecting element 40 which in turn is mounted in articulated manner on the front area 29 of the cowling. A displacement of the intermediate element 38 thus results in swiveling of the blocker door 33, as shown by the dashed line in FIG. 6.

The intermediate element 38 is thus designed both as a piston provided inside the main cylinder 37 and as a cylinder, so that a piston element 41 is displaceably accommodated in the intermediate element 38 and is, like a double-acting piston, moveable inside the latter in both directions relative to the intermediate element 38. The piston element 41 is connected to the rear area 30 of the cowling. This permits a compact design. The deflecting elements 32 and the blocker doors 33 are thus either functionally coupled to the axially displaceable rear area 30 of the engine cowling 28 or are moved in a suitable manner by means of the drive element 36.

FIG. 6 shows the thrust reversal state, in which the rear area 30 of the engine cowling 28 is moved back completely such that the free annular space 31 is completely open. The deflecting elements 32 are fully inside the free annular space 31 in order to divert the thrust reversal flow. At the same time the blocker doors 33 are swiveled into the bypass duct 35 in order to close the latter. The blocker doors 33 are here in contact with the core engine cowling 34. The swiveling of the blocker doors 33 can, in an alternative embodiment to the solution shown, also be achieved for example by a forced control using a suitable kinematic system or another suitable lever mechanism.

The rearward movement after the landing of the aircraft can be achieved by means of the drive element 36 in one or two stages.

It is evident that with the solution in accordance with the invention, no structural elements whatsoever which might impede or hinder the air flow in the forward thrust position are arranged inside the bypass duct 35. Similarly, it is possible to bring the front and the rear areas of the engine cowling in the forward thrust position into contact with one another and to seal them such that almost no flow losses or disturbances of the flow occur.

LIST OF REFERENCE NUMERALS

1 Engine axis/center axis
10 Gas-turbine engine
11 Air inlet
12 Fan rotating inside the casing
13 Intermediate-pressure compressor
14 High-pressure compressor
15 Annular combustion chamber
16 High-pressure turbine
17 Intermediate-pressure turbine
18 Low-pressure turbine
19 Exhaust nozzle 20 Guide vanes
21 Engine casing/cowling
22 Compressor rotor blades
23 Stator vanes
24 Turbine blades
26 Compressor drum or disk
27 Turbine rotor hub
28 Cowling (nacelle)
29 Front area of cowling
30 Rear area of cowling
31 Free annular space/annular space
32 Deflecting element (cascade)
33 Blocker door
34 Core engine cowling
35 Bypass duct
36 Drive element
37 Main cylinder
38 Intermediate element
39 First connecting element
40 Second connecting element
41 Piston element

What is claimed is:

1. A thrust reversing device for an aircraft gas turbine engine:
wherein the gas turbine engine includes an engine cowling, a core engine cowling and a bypass duct positioned between the engine cowling and the core engine cowling;
wherein the engine cowling includes a stationary front area and a displaceable rear area which is displaceable in an axial direction of the engine from a closed forward thrust position into a rearwardly displaced thrust reversal position, resulting in an essentially annular space in the front area;
the thrust reversing device comprising:
at least one blocker door movable between a forward thrust first position and a thrust reversing second position at least partially blocking the bypass duct;
at least one drive element for moving the at least one blocker door between the first position and the second position;
at least one connecting element connecting the at least one blocker door to the engine, the at least one connecting element including at least one elongated body and first and second articulated mounts positioned along the elongated body with the first articulated mount connected to the at least one blocker door and the second articulated mount connected to the engine;
the at least one blocker door, the at least one drive element and the at least one connecting element positioned inside of the front area and outside of the bypass duct and does not form a portion of the bypass duct when the at least one blocker door is in the first position,
the at least one drive element being provided between the front area and the rear area, and connected to the rear area for axially displacing the rear area, the drive element being a two-stage drive element including a first stage and a second stage, and effecting in the first stage a partial axial displacement of the rear area on an axial partial displacement path, and in the second stage a full axial displacement of the rear area on a full axial displacement path.

2. The device of claim 1, wherein the at least one drive element is telescopic.

3. The device of claim 2, wherein the at least one drive element includes at least one chosen from a hydraulic and electric piston/cylinder arrangement.

4. The device of claim 3, and further comprising deflecting elements including a plurality of cascades for deflecting a flow from the bypass duct in a thrust reversing direction, the deflecting elements having an axial length, wherein, in the first stage, the at least one drive element axially moves the deflecting elements over part of the axial length into a partially opened space formed by the axial partial displacement path.

5. The device of claim 4, wherein, in the second stage, the at least one drive element axially moves the at least one blocker door into the partially opened space.

6. The device of claim 5, wherein, in the second stage, the at least one drive element moves the at least one blocker door to swivel radially inward into the bypass duct for at least partially blocking the bypass duct.

7. The device of claim 6, wherein, in the closed forward thrust position, the rear area of the engine cowling is in tight contact with the front area of the engine cowling.

8. The device of claim 1, wherein the at least one drive element is telescopic.

9. The device of claim 1, wherein the at least one drive element is at least one chosen from a hydraulic and electric piston/cylinder arrangement.

10. The device of claim 1, and further comprising deflecting elements for deflecting a flow from the bypass duct in a thrust reversing direction, the deflecting elements having an axial length, wherein, in the first stage, the at least one drive element axially moves the deflecting elements over part of the axial length into a partially opened space formed by the axial partial displacement path.

11. The device of claim 1, wherein, in the second stage, the at least one drive element axially moves the at least one blocker door into a partially opened space formed by the axial partial displacement path.

12. The device of claim 1, wherein, in the second stage, the at least one drive element moves the at least one blocker door to swivel radially inward into the bypass duct for at least partially blocking the bypass duct.

13. The device of claim 1, wherein, the front area of the engine cowling includes a radially inward portion forming a first portion of the bypass duct and the rear area of the engine cowling includes a radially inward portion forming a second portion of the bypass duct rearward of the first portion, and wherein, when in the closed forward thrust position, the radially inward portion of the rear area of the engine cowling is in tight contact with the radially inward portion of the front area of the engine cowling around a circumference of the bypass duct and the at least one blocker door, the at least one drive element and the at least one connecting element are positioned radially outward of at least one chosen from the radially inward portion of the front area of the engine cowling and the radially inward portion of the rear area of the engine cowling to be separated from the bypass duct.

* * * * *